H. PFARRER.
Gear Cutting Engine.
No. 25,759.
Patented Oct. 11, 1859.
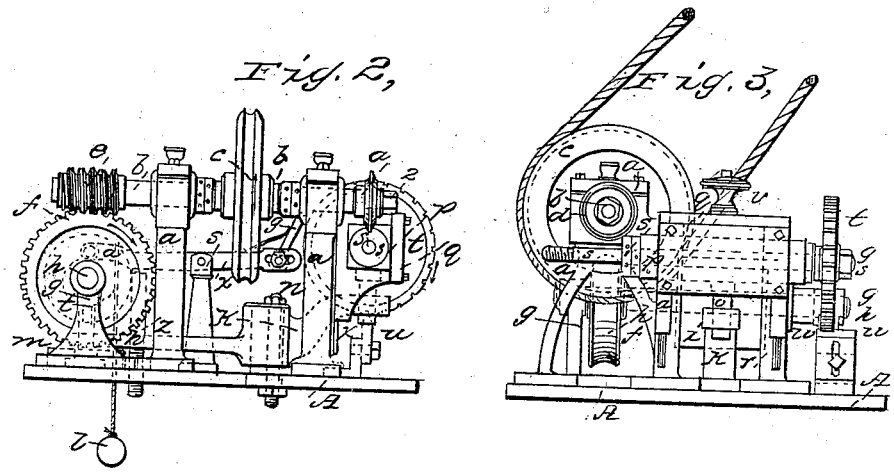
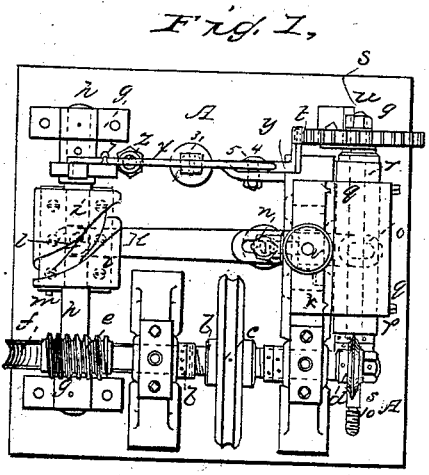

UNITED STATES PATENT OFFICE.

HENRY PFARRER, OF NEW YORK, N. Y.

GEAR-CUTTING ENGINE.

Specification of Letters Patent No. 25,759, dated October 11, 1859.

*To all whom it may concern:*

Be it known that I, HENRY PFARRER, of the city and State of New York, have invented, made, and applied to use certain new and useful Improvements in Gear-Cutting Engines; and I do hereby declare that the following is a full, clear, and exact description of the construction and operation of the same, reference being had to the annexed drawing, making part of this specification, wherein—

Figure 1, is a plan of said engine. Fig. 2, is a side elevation, and Fig. 3, is an elevation at right angles to Fig. 2.

Similar marks of reference denote the same parts.

My said invention consists in mounting the gear to be cut on the same axis as a pattern or gear containing the same number of teeth as the intended gear, to which a pawl is applied in such a manner that the pattern and gear are turned when the cutter is not in contact with the gear and upon end motion being given to both pattern and gear to bring the latter in contact with the cutter the notch of said pattern slides onto a stationary dog that holds both pattern and gear while the cutting progresses, thus forming an automatic engine.

In the drawing, A is a suitable bed upon which standards and journal boxes $a$, $a$, are fitted sustaining the main driving shaft $b$, on which a pulley $c$, receives a band or belt to revolve said shaft and with it the rotary cutter $d$.

1, 1, are pairs of jam-nuts which may be used on the shaft $b$, to prevent looseness, and also to adjust the cutter and shaft lengthwise to allow for slight variations in different cutters affixed to the end of said shaft $b$, by the clamping nut 2.

$e$, is a worm pinion taking the wheel $f$, on the shaft $h$, that is sustained in boxes $g$, $g$, and gives motion to the other parts as next described. $i$, is a cam on the shaft $h$, acting on a roller $l$, fitted on a slide in ways $m$, and taking the slotted end of the lever $k$, the fulcrum $n$, of which may be adjustable to regulate the relative movements of the respective ends and give more or less movement to a sliding stock $p$, that is fitted with a stud $o$, taking the end of this lever $k$. The sliding stock $p$, is fitted in a head block $q$, that is adjustable vertically on the standards $r$, by means of the screw $v$, the object being to allow for the introduction of larger or smaller gears which gears are formed out of a proper blank attached to the outer end of a spindle $s$, against the nuts 8, 8, by a movable nut on the end 10 of the shaft or spindle $s$. This shaft or spindle $s$, passes through the sliding stock $p$, and has a gear or pattern $t$, attached thereto by means of a nut 9, and in this gear or pattern the same number of teeth or notches are formed as there are to be teeth in the wheel. $u$, is a stationary dog that is properly fitted and adjusted to take the notches or teeth of this pattern $t$, and so placed that when the stock $p$, is slid along with the gear or blank clear of the cutter $d$, the said pattern $t$, will be off of the dog $u$, and can be turned so that on being again slid forward as the cutting commences the said dog $u$, takes the next notch and holds both the pattern and gear perfectly steady while the cutter is operating.

In order to turn the pattern and blank gear between the respective cuts I make use of a lever $x$, on a fulcrum 3, at one end of which a pawl $y$ is provided on a center pin 4, in a slot in said lever $x$, so as to be adjustable to different patterns $(t)$ and at the other end of this lever $x$, is a roller 6, over a cam $w$, on the shaft $h$. As this cam $h$, revolves in the direction of the arrow it lifts the roller 6, and draws down the pawl $y$, a sufficient distance to take the next notch of the pattern $t$, this is done while the cutting is progressing and the gear and stock sliding back to the place of beginning, at which moment the end of cam $w$, passes from under the roller 6, and the lever $x$, by the weight 7 (or its equivalent) drops and turns the pattern and gear one tooth, the exact point being regulated, so that the stop or dog $u$, enters the notch correctly, by an adjustable stop pin $z$, that determines exactly the fall of the lever $x$, and the turning of the pattern.

Having thus described my said invention I remark that it will be evident that bevel or miter gears can be cut by this invention by having the axis $s$, diagonal to the sliding stock; and further that the cutter might be adjusted vertically instead of the stock carrying the gear, and that the peculiar construction of this stock or bed might be varied without departing in the least from my said invention.

What I claim as my invention and desire to secure by Letters Patent is—

1. A pattern $t$ mounted on a shaft or spindle which also carries the gear to be cut, in combination with a fixed dog or guide $u$, when said dog or guide is so located that the pattern runs off and is clear of the same so as to be turned at the time the gear is clear of the cutter; and said pattern again takes and is held by said dog as the cutting commences and is proceeded with, as set forth.

2. I also claim the arrangement of the lever $x$, pawl $y$, and adjustable stop $z$, to give motion to the pattern $t$, when not in contact with the stop or dog $u$, as described and shown.

3. In combination with the pattern $t$ and dog $u$, I also claim the stock $p$, carrying the shaft or spindle $s$, and actuated by the lever $k$ for the purposes and as specified.

In witness whereof I have hereunto set my signature this twelfth day of September 1859.

HENRY PFARRER.

Witnesses:
 THOS. GEO. HAROLD,
 CHAS. H. SMITH.